Patented Nov. 12, 1929

1,735,313

UNITED STATES PATENT OFFICE

SAMUEL B. CHAMBERS, OF CHICAGO, ILLINOIS

METHOD OF TREATING DAIRY PRODUCTS

No Drawing.   Application filed August 19, 1925.   Serial No. 51,081.

This invention relates to a method of treating milk, cream, butter, olemargarine or other dairy products, and has for its object the provision of a treatment which shall improve the quality of the product, which shall keep the product fresh for a prolonged period of time, which shall prevent rancidity and which shall be economical and convenient to apply.

The invention is exemplified in the steps of the process described by way of example in the following specification, and it is more particularly pointed out in the appended claims.

One of the greatest difficulties in the distribution of dairy products arises from the necessity of delivering the product to the customer within a very limited period of time in order that it may reach the customer before it begins to deteriorate. The present invention may be applied with decidedly beneficial results to milk, cream, butter and other dairy products and not only prevents deterioration for a prolonged period of time but does so without detracting in any way from the food value or flavor of the product and without the addition of any preservative which in any sense is injurious to the consumer. While I have been unable to tell with certainty the exact reasons for the effects produced by my invention, I believe that the effects are largely due to the fact that the process affects some portion of the composition of the material upon which injurious bacteria depend for development. The process also controls the butter fat and prevents it from becoming rancid. It has been found by tests that butter even though unsalted, when treated by the process of the present invention will remain fresh and sweet for weeks at a temperature of 70 degrees F. without becoming rancid.

The treatment may be applied in various ways and a considerable range of proportions and temperatures may be employed. The process as described is given by way of example, but it will be understood that the invention is not confined to the exact proportions and temperatures recited. A convenient way of treating butter is to apply the treatment to the cream prior to churning the butter. The material used for treating the dairy products is malt diastase. This may be obtained in the form of an extract or syrup. The diastase upon the market varies largely in diastatic strength. The strength is designated according to the Lintner test. In order to get the best results the diastase used should not be less than 140 degrees diastatic strength. Beneficial results can be secured with lower strength diastase, but a greater quantity and longer time of treatment is required and the flavor may be slightly affected. With a high strength diastase smaller amounts are necessary and the natural form is not affected and no malt taste is noticeable. Assuming that a malt diastase of 150 degrees diastatic strength is employed, one and one-half pounds of the diastase may be used for each 100 pounds of cream. The cream may be treated raw or after it has been pasteurized, but I prefer to treat the raw cream as the treatment itself effects pasteurization so that further pasteurization is unnecessary. The cream and diastase are thoroughly mixed together preferably at 80 to 110 degrees Fahrenheit. The material may be more readily mixed at this temperature than if the cream is cold. When the cream and diastase have been mixed together, the temperature is raised to preferably 125 to 135 degrees Fahrenheit and maintained at this temperature from one and a half to two hours. Results may be secured at a temperature as low as 110 degrees F., but the temperature should not exceed 140 degrees F. If a temperature much above 140° F. is reached the action of the diastase will be destroyed. The time of treatment may be varied according to the strength and amount of diastase used, but I prefer to use a comparatively small amount of diastase and prolong the action for a longer period of time, as this method of treatment does not affect the flavor of the product. If a greater amount of diastase is used the treatment may be accomplished in a shorter period of time but the flavor may be slightly altered. At the end of the period of treatment the temperature is raised to approximately 150 degrees F. and the cream is held at this temperature for about five minutes. A higher temperature may be used up to 180 degrees F. if desired, but 150 degrees F. is usually sufficient. This temperature stops the action of the diastase and also the heat treatment at the temperatures named effects pasteurization of the cream. The cream is then cooled and may be used in the regular way as cream. It will be found to have superior keeping qualities, but otherwise to have all of the essential characteristics of pure pasteurized cream. If it is desired to use the cream for producing butter, it may be churned at any time after the treatment in the usual way. The butter resulting from the treated cream will be found to have keeping qualities far in excess of butter made in the usual way but in other respects to be practically undistinguishable from the best grades of butter. Where the cream is treated according to the present invention it has been found that the addition of cultures as ordinarily practiced in preparing cream for churning, is not necessary. The process may be applied to whole milk as well as cream with the result that the milk may be kept for a greatly prolonged period of time without souring.

I claim:

1. The method of treating dairy products, comprising the steps of subjecting the product to malt diastase of a minimum strength of 140 degrees Lintner test.

2. The method of treating dairy products, comprising the steps of subjecting the product to malt diastase, maintaining the product thus treated at a temperature above 110 degrees Fahrenheit for a limited period of time, and subsequently raising the temperature above 140 degrees Fahrenheit to stop the action of the diastase.

3. The method of treating dairy products, comprising the steps of mixing malt diastase of a strength of approximately 150 degrees Lintner test with the product to be treated, the proportions being approximately one and a half pounds of malt diastase to 100 pounds of the product, and subjecting the mixture to a temperature in excess of 110 degrees Fahrenheit for a limited period of time.

4. The method of treating milk or cream wherein the milk or cream is mixed with malt diastase of a minimum strength of 140 degrees Lintner test, the mixture being in the proportion of one hundred pounds of milk or cream to one and one-half pounds of malt diastase, maintaining the mixture at a temperature of approximately 125 to 135 degrees Fahrenheit for a period of approximately one and one-half hours, after which the temperature is raised to a point above 140 degrees for a short period of time to stop the action of the diastase and to complete pasteurization of the milk or cream.

5. The method of producing butter having superior keeping qualities, comprising the steps of subjecting cream to the action of malt diastase and thereafter churning the cream to produce butter.

6. The method of producing butter having superior keeping qualities, comprising the steps of subjecting cream to the action of malt diastase at pasteurizing temperatures and thereafter churning the cream to produce butter.

7. The method of producing butter having superior keeping qualities, comprising the steps of mixing cream with malt diastase, holding the mixture at a temperature of 110 to 140 degrees Fahrenheit for a period of approximately one and one-half to two hours, thereafter raising the temperature to a point above 140 degrees Fahrenheit to stop the action of the diastase and to complete pasteurization of the cream, after which the cream is cooled and churned to produce butter.

8. The method of producing butter having superior keeping qualities, wherein malt diastase having diastatic strength of approximately 140 degrees Lintner test is mixed with raw cream in proportion of approximately one and one-half pounds diastase to one hundred pounds cream, the cream being thereafter maintained at a temperature of 125 to 135 degrees Fahrenheit for a period of approximately one and one-half hours, after which the cream is raised to a temperature of approximately 150 degrees Fahrenheit for a period of five minutes or less, the cream thereafter being cooled and churned to produce butter.

In testimony whereof I have signed my name to this specification on this 17th day of August, A. D. 1925.

S. B. CHAMBERS.